(12) United States Patent
Tavares (10) Patent No.: US 7,275,147 B2
(45) Date of Patent: Sep. 25, 2007

(54) METHOD AND APPARATUS FOR DATA ALIGNMENT AND PARSING IN SIMD COMPUTER ARCHITECTURE

(75) Inventor: Clifford Tavares, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 468 days.

(21) Appl. No.: 10/403,152

(22) Filed: Mar. 31, 2003

(65) Prior Publication Data

US 2004/0193848 A1 Sep. 30, 2004

(51) Int. Cl.
*G06F 9/315* (2006.01)

(52) U.S. Cl. .................. 712/224; 712/204; 712/208; 712/300; 712/2

(58) Field of Classification Search ............ 712/224, 712/204, 208, 300, 2
See application file for complete search history.

(56) References Cited

U.S. PATENT DOCUMENTS

| | | | | |
|---|---|---|---|---|
| 3,360,779 | A * | 12/1967 | Ulrich | 712/224 |
| 4,980,853 | A * | 12/1990 | Hutchins | 711/109 |
| 5,898,601 | A | 4/1999 | Gray et al. | |
| 5,922,066 | A * | 7/1999 | Cho et al. | 712/204 |
| 5,933,650 | A * | 8/1999 | van Hook et al. | 712/2 |
| 6,094,637 | A | 7/2000 | Hong | |
| 6,122,725 | A * | 9/2000 | Roussel et al. | 712/200 |
| 6,175,892 | B1 | 1/2001 | Sazzad et al. | |
| 6,243,803 | B1 * | 6/2001 | Abdallah et al. | 712/210 |
| 6,266,758 | B1 * | 7/2001 | van Hook et al. | 712/2 |
| 6,460,127 | B1 | 10/2002 | Akerib | |
| 2002/0138535 | A1 | 9/2002 | Tsuji | |

OTHER PUBLICATIONS

Aubury, et al. Handel-C Language Reference Guide, Aug. 28, 1996, Oxford University Computing Laboratory.*
Patterson et al. Computer Organizatin & Design, 1998, Morgan Kaufmann, Second Edition, p. 226.*
Website: "MMX and SSE" http://www.abo.fi/~mats/codeopt/mmx.pdf; printed on Oct. 29, 2002; associated web page last updated on Mar. 23, 2001 (see http://www.abo.fi/~mats/codeopt.pdf).

* cited by examiner

*Primary Examiner*—Donald Sparks
*Assistant Examiner*—Vincent Lai
(74) *Attorney, Agent, or Firm*—Sughrue Mion, PLLC; Joseph Bach (57) ABSTRACT

Execution of a single stand-alone instruction manipulates two n bit strings of data to pack data or align the data. Decoding of the single instruction identifies two registers of n bits each and a shift value, preferably as parameters of the instruction. A first and a second subset of data of less than n bits are selected, by logical shifting, from the two registers, respectively, based solely upon the shift value. Then, the subsets are concatenated, preferably by a logical OR, to obtain an output of n bits. The output may be aligned data or packed data, particularly useful for performing a single operation on multiple sets of the data through parallel processing with a SIMD processor.

14 Claims, 9 Drawing Sheets

METHOD AND APPARATUS FOR DATA ALIGNMENT AND PARSING IN SIMD COMPUTER ARCHITECTURE

FIELD OF THE INVENTION

The present invention relates to data manipulation, for example to align and pack data elements from a stream of data for subsequent parallel processing.

BACKGROUND OF THE INVENTION

Data processing, particularly with respect to streaming data and parallel processing, has suffered from the limits of existing processor instructions with respect to low speed relative to the speed of the streaming data, as well as the complexity of the number of instructions and the amount of code required to execute needed functions.

Computer processors allowing for packed SIMD (Single Instruction Multiple Data) type of operations, i.e. performing one operation on multiple sets of data through the use of parallel processing, are designed, for example, to speed up standard digital filter operations in digital signal processing (DSP). This is achieved by exploiting some of the characteristic symmetry inherent in digital filter equations. These operations find a broad range of applications in most signal processing algorithms like Fast Fourier Transform (FFT), FIR/IIR filters and trigonometry, as well as in statistical analysis algorithms. This class of operations is specifically for data manipulation within a packed register.

As a specific example, a plurality of small equal length numbers are packed into a 64 bit double word as elements of a vector and then the elements are extracted and parallel operated upon independently. The SIMD operation requires that these data elements be aligned within the double word. However, the data as received is frequently not aligned for the SIMD operation and there have been many attempts to obtain such alignment of the input data in an efficient manner, with respect to such factors as processing time, power, hardware complexity and software complexity.

There is a need for efficient data alignment and packing.

U.S. Pat. No. 5,898,601 issued Apr. 27, 1999 to Gray et al, with respect to SIMD processing, compresses bit formats provided in a first packed data sequence with five instructions: generates a second packed data element sequence by copying the first packed data sequence, masks a portion of the first packed data, shifts data elements of the first packed data sequence independently by separate shift counts, masks a portion of the second packed data sequence, and joins the second and first packed data sequences.

U.S. Pat. No. 5,922,066, issued July 1999 to Seongrai Cho et al, discloses a hardware data aligner of a SIMD processor, wherein the aligner shift operation changes the positions of data elements in a data vector to align a data to a base address that is an even multiple of the number of bytes in a data vector. An example of usage would be the alignment of input data to 32 bit boundaries for four bytes of input data.

Both U.S. Pat. No. 5,933,650 issued Aug. 3, 1999 to van Hook et al and U.S. Pat. No. 6,266,758B1 issued Jul. 24, 2001 to van Hook et al relate to data alignment and SIMD processing. A first data vector is loaded from a memory into a first register and a second vector is loaded from the memory into a second register. A starting byte in the first register is determined by being specified as a constant in an alignment instruction and the starting byte specifies the first byte of an aligned vector. A subset of elements is selected from the first register and the second register; a first width vector from the first register and the second register is extracted beginning from the first bit in the first byte of the first register continuing through the bits in the second register. The elements from the subset are then replicated into elements in a third register in a particular order suitable for subsequent SIMD processing. FIG. 5 shows an example of extracting an aligned vector from two vectors.

U.S. Pat. No. 6,094,637 issued Jul. 25, 2000 to Hong reverses the order of data elements in a vector register for SIMD processing.

U.S. Pat. No. 6,175,892 issued Jan. 16, 2001 to Sazzad et al specifies a row and/or column of data with a SIMD instruction operand, particularly for a two-dimensional register array.

U.S. Pat. No. 6,460,127 B1 issued Oct. 1, 2002 processes a plurality of samples of an incoming signal in parallel, by including operations such as those in the listing spanning columns 26 and 27.

U.S. Pat. No. 6,243,803 discloses a method and apparatus for computing packed absolute differences with a plurality of sign bits using SIMD add circuitry.

Example shift instructions for SIMD processing include: PSLLW, PSLLD, PSLLQ-Shift Packed Data Left Logical; PSRLW, PSRLD, PSRLQ-Shift Packed Data Right Logical; and PSRAW, PSRAD-Shift Packed Data Right Arithmetic. These instructions shift the destination elements the number of bits specified in the count operand.

Therefore, there is a need for an improved instruction to improve data manipulation, particularly for subsequent parallel processing at a higher speed relative to existing instructions and of less complexity to execute needed functions, particularly including aligning and packing data elements from a stream of data.

SUMMARY OF THE INVENTION

These and other needs are addressed by the present invention.

As a result of analyzing the prior art, the inventor has found a need for an improved instruction for data manipulation, particularly for subsequent parallel processing at a higher speed and of less complexity to execute needed functions that particularly include aligning and packing data elements from a stream of data.

Therefore, the present invention analysis of the prior art system as to its problems and their causes has lead to the need for and the solution of a more effective data manipulation instruction, as well as a system and method using the instruction.

Operations for digital filters and packed data manipulation are specifically for data manipulation within a packed register. In many applications for signal processing as well as in data parsing, the data is continuous, packed and of various data types and precisions. The operations of the present invention allow for direct extraction as well as creation of such data, which will allow for packed arithmetic to be applied to this problem.

Most fixed point DSP applications and algorithms fall into the domain of the instructions of the present invention. Current applications based on streaming audio and streaming video, require the handling of compressed data in fixed point packed format consisting of data types of different sizes and alignments, and may also consist of bit fields. Streaming data has no consideration of alignment and is unsuitable for SIMD processing directly. Continuous extraction as well as continuous creation of such data streams is desirable and has been a big overhead for most DSP applications in the form of many instructions required for data manipulation associated with multiple shifts, logical operations (like masking, AND and OR), and a large number of load store operations. There has also been data alignment overhead associated with load store operations.

The present invention identifies and addresses three problems of streaming data that the prior art handles in C code: there is a variable bit length of different adjacent data elements; there is no consideration of alignment; and the data is continuous, e.g. among packets.

The present invention identifies these problems and their causes and addresses the solution to these problems with a stand alone single data manipulation instruction requiring at most three parameters to specify registers and a shift value used to control shift and logical operations for data alignment or data packing, particularly for streaming data. As a result, when compared to the prior art, the present invention reduces the number of memory operations, and reduces the number of logical instructions.

Still other aspects, features, and advantages of the present invention are readily apparent from the following detailed description, by illustrating a number of particular embodiments and implementations, including the best mode contemplated by the inventor for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawing, in which like reference numerals refer to similar elements, and in which.

DESCRIPTION OF THE PREFERRED EMBODIMENT

Figure 2:
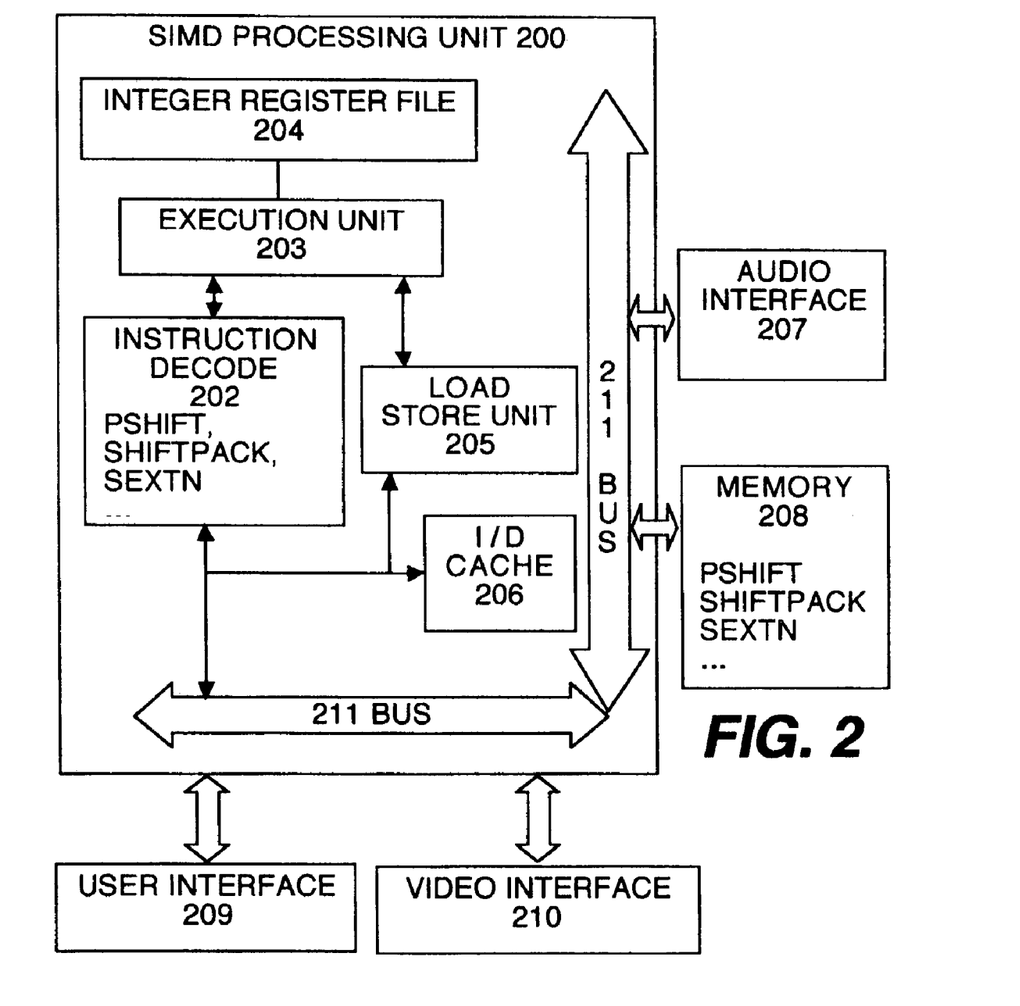
FIG. 2 shows a computer system of the present invention for executing PSHIFT and SHIFTPACK operations according to the present invention.

The computer architecture shown in FIG. 2 includes existing hardware for packed arithmetic occurring in a standard SIMD processing unit 200. SIMD processing unit 200 is enhanced by combination with a computer readable storage 207 having data as computer readable code that includes three specific instructions, namely PSHIFT, SHIFTPACK AND SEXTN, which are decodable with the instruction decode unit 202 and executable with the execution unit 203, according to the present invention. The execution unit 203 is coupled to the integer register file 204 and the load store unit 205, in a known manner. Additional control signals may be required depending on the implementation of the SIMD micro architecture processing unit 200.

The exemplary hardware circuits used include an audio interface including a sound card and speakers combination 207 for audio processing; a memory 208, including RAM, ROM, FLASH, and hard drive memories, for example, which may be peripheral, on a board or on chip with the processor of the execution unit; a user interface 209 of any known type, including a mouse, a keyboard, a touchpad, WAN connection and voice recognition for communication with a user or agent; a video interface including a capture card and LCD combination 210 for visual arts processing; the SIMD processing unit (including parallel operating central processing units) 200; and one or more buses 211 to operatively couple these components.

The standard SIMD processing unit 200 includes an internal bus that couples the integer register file 204 (e.g. an intermediate double precision register), the execution unit 203 (shown in greater detail in FIG. 3) that has arithmetic logical and control units as required to execute each instruction, the load store unit 205, an I/D Cache 206, and an instruction decode unit 202 capable of decoding the instruction opcodes native to the processor as well as the new instruction opcodes PSHIFT, SHIFTPACK and SEXTN. The integer register file 204, as another example, may be a single width size register, called RegSize herein; this size can be different for different processors.

Figure 3:
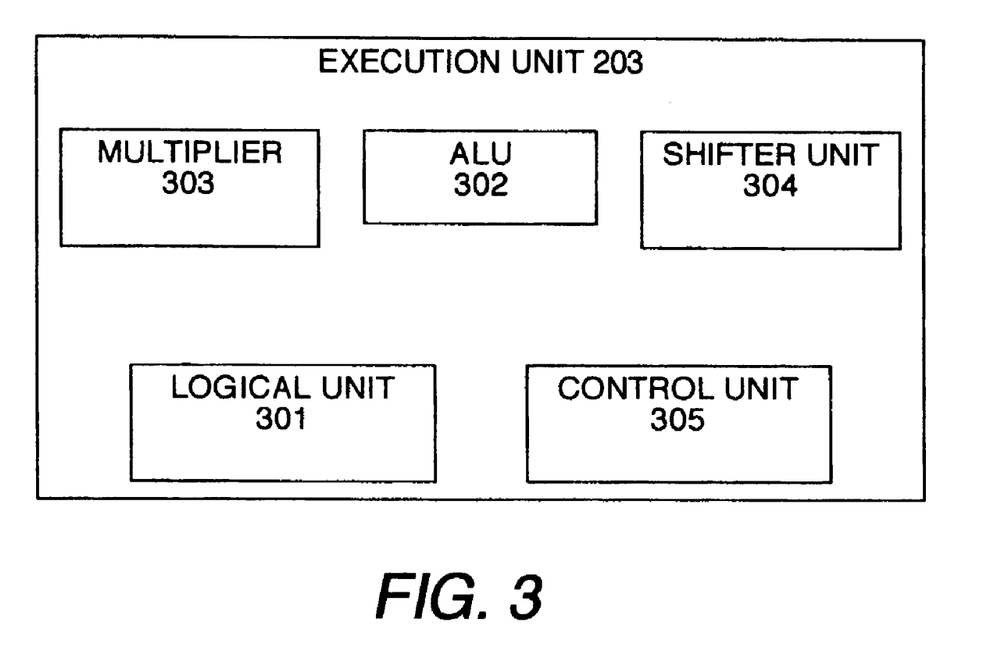
FIG. 3 shows the execution unit of FIG. 2 in representative greater detail.

An exemplary execution unit 203 for execution of the pipe shifter instruction PSHIFT in a shift operation in a processor is shown in further detail in FIG. 3 to include: a logical unit 301 having circuits that include hardware logic for Boolean logic operations like OR and AND; The ALU (Arithmetic Logic Unit) 302 that has circuits and hardware for adders, multipliers and accumulators; a multiplier 303; a shifter unit 304; and control unit 305. The control unit 305 has hardware, for example, control lines, multiplexers (MUX) and latches. As a part of the SIMD processing unit 200, the control unit 305 will also include symmetric shifters, multipliers, logical circuits and control circuits or combinations of these depending on the SIMD operations to be performed. This instruction or operation may be implemented in a standard processor using the standard circuits for the shifter unit 304 and the logical unit 305 having the logical 'OR' operation.

The pipe shifter instruction, PSHIFT, manipulates packed data to align it by effectively logically shifting two concatenated register contents by a given shift value to obtain a result that represents the lower 'single width' value of the concatenated register with the given shift applied to it. The pipe shifter instruction, PSHIFT, is also an operation for bit extraction. Logically shifting is performed in many ways, some of which are shown in detail herein and include logical shifters, arithmetic shifters followed by null loading, generating a logical mask and performing a Boolean AND with shifted data and right shifting followed by left shifting.

Figure 1:
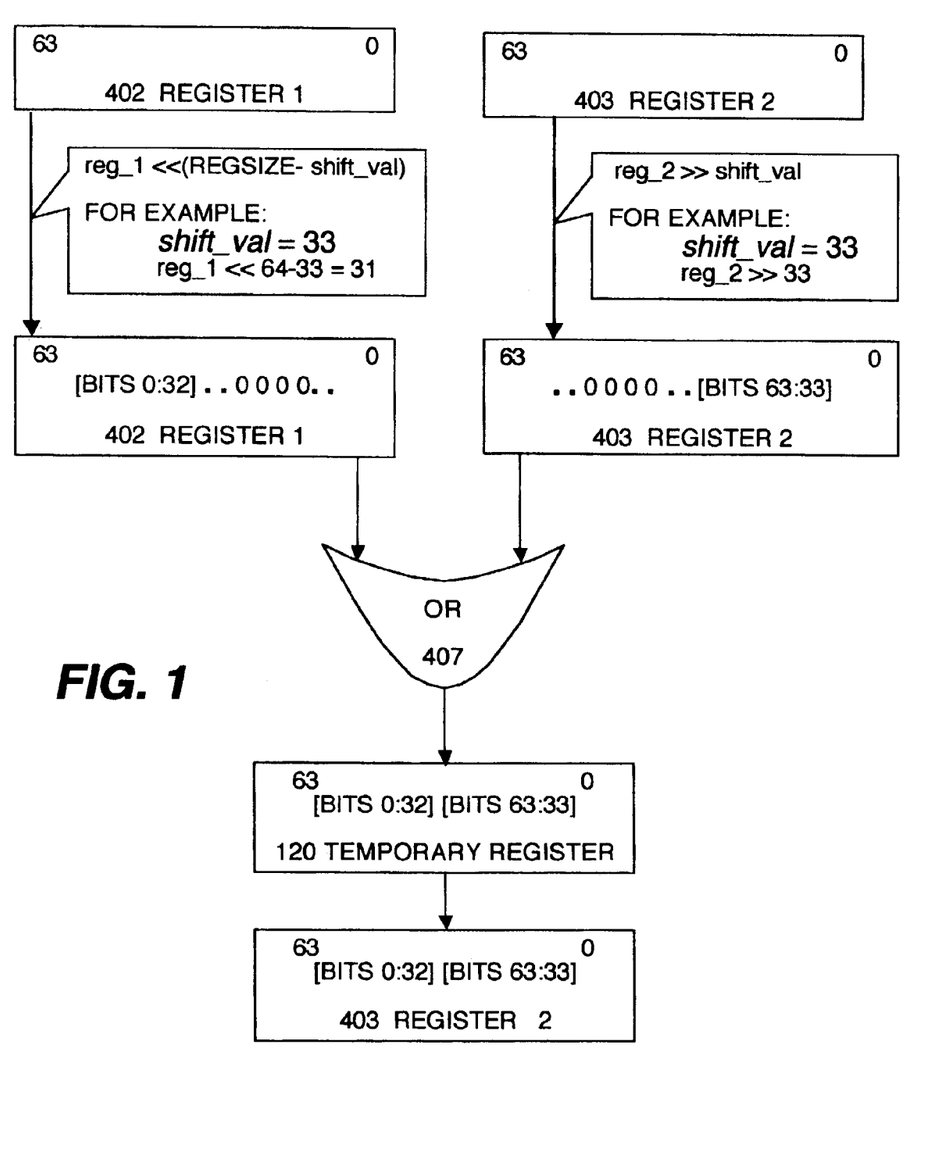
FIG. 1 illustrates the PSHIFT instruction or operation of the present invention, for an exemplary shift_val=33.

Exemplary code for the use of the instruction PSHIFT, as shown in FIG. 1, uses: PSHIFT reg_1,reg_2, shift_val, which is executed as follows: LINE 1: tmp_reg=reg_1 <<(RegSize-shift by shift_val) OR (reg_2>> shift by shift_val); and LINE 2: reg_2=tmp_reg.

The values or parameters used in the example execution of PSHIFT as shown in FIG. 1 are reg_1=register 402, reg_2=register 403, and shift_val=33. The logic block diagram of FIG. 1 shows an exemplary implementation for input registers 402 and 403 of bit size n. The number of bits required to specify the unsigned Shift_val is, $Log_2$ n. LINE 1 is executed by the shifter unit 304, the logical unit 301 and the control unit 305.

The Pipe Shifter instruction, PSHIFT, is useful in applications for: parsing algorithms, for example, Huffman and variable length coding (VLC); most fixed point arithmetic; unpacking of data, for example, bit fields; normalization and fixed-point arithmetic for example for digital filters; and replacing aligned data extract instructions in SIMD or general purpose processors, for example, the general purpose processor SH-5 of Hitachi Ltd. that employs the instruction MEXTRx, which extracts a combination of bytes from two registers. Also, the PSHIFT instruction is useful in applications using fixed point and packed data types, which includes most fixed point DSP (Digital Signal Processor) applications and algorithms.

Current applications based on streaming audio and streaming video, require the handling of compressed data in fixed point packed format consisting of data types of different sizes and alignments and which compressed data may also consist of bit fields. This involves continuous extraction of such data streams as well as creation of such data streams. This has been a big overhead for most DSP applications in the form of data manipulation associated with multiple shifts and logical operations like masking and OR, and a large number of required load store operations. There has also been data alignment overhead associated with load store operations.

Figure 4:
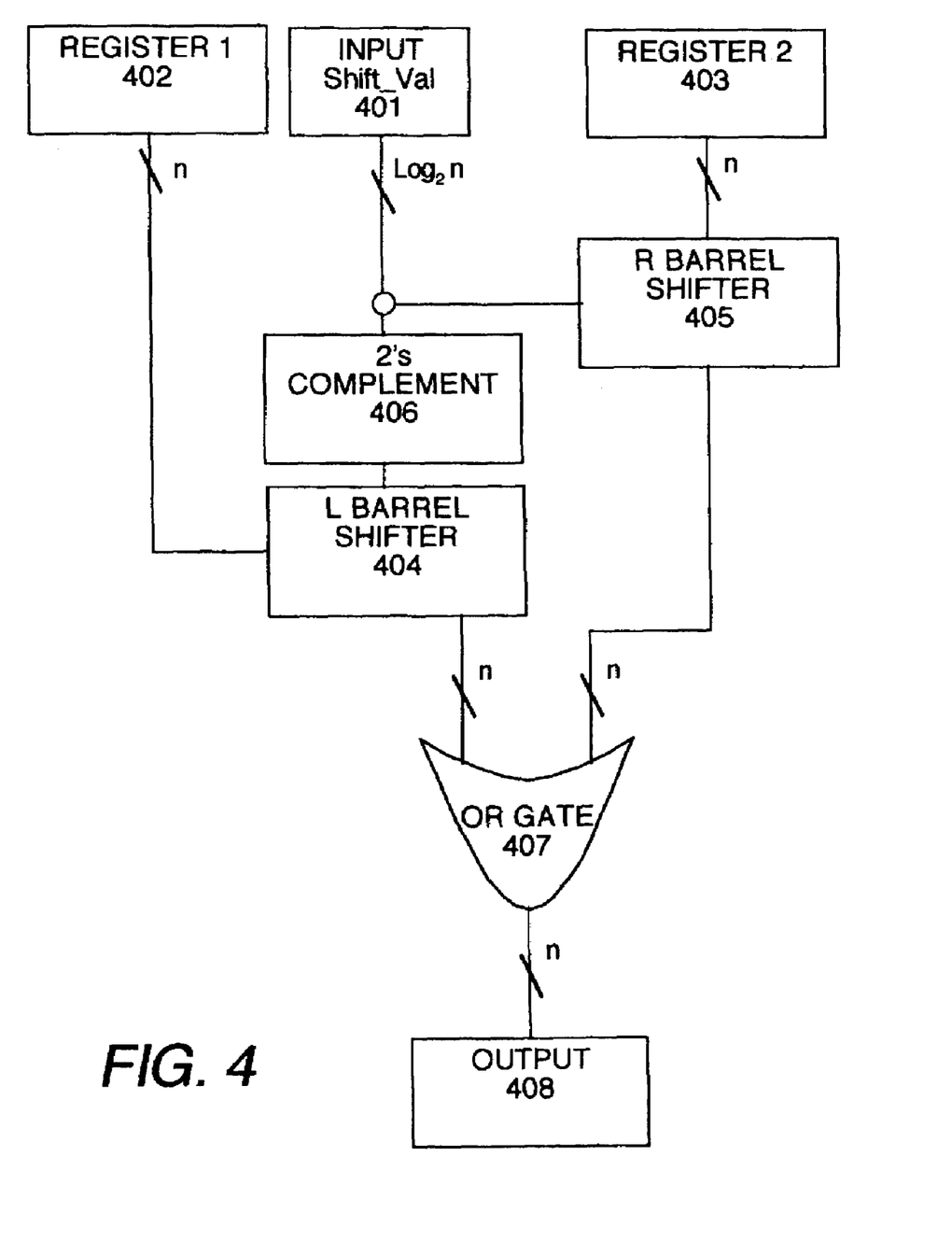
FIG. 4 is an architecture block diagram for the execution of the PSHIFT instruction of the present invention, for an exemplary shift_val=33.

As shown in FIG. 4, an exemplary computer architecture having 64-bit register sizes implements the PSHIFT instruction. FIG. 4, as suggested by the pseudo code, is a stand-alone implementation, meaning that it does not require the support of other instructions to align data. The L (left) barrel shifter 404 and R (right) barrel shifter 405 may be discrete circuits or dual barrel shifters as may be found commonly in SIMD or vector processors. The registers 402 and 403 of the execution unit of FIG. 3 feed their content, of n bits, to the barrel shifters 404, 405, respectively. The two shift coefficients required for the L barrel shifter 404 and the R barrel shifter 405 are supplied as n-Shift_val and Shift_val, respectively. The shifting provided by the L barrel shifter 404 and the R barrel shifter 405 is preferably logical, that is with the loading of nulls. The Shift_val term is the instruction parameter obtained as input 401 from the instruction decode unit 202 of FIG. 2 by decoding the instruction PSHIFT, and the n-Shift_val term is easily computed from the Shift_val term using the two's complement circuit 406.

The OR gate 407 performs the logical OR operation to combine the outputs of the two shift operations performed in the L barrel and R barrel shifters, 404, 405. The result of the logical OR operation is held in the OUTPUT 408, which may be the output node of the OR gate, as in FIG. 1, or the OUTPUT 408 may be held in the temporary register 120 of FIG. 1, or the OUTPUT 408 may be held in the register 403. The actual implementation used in a commercial embodiment depends on the available hardware.

The data manipulation provided by the pipe shift operation of the single stand alone instruction PSHIFT is generic and replaces a plurality of standard SIMD instructions for byte level data unpacking (for example PSHIFT replaces the MEXTRx operation in the SuperH SH-5 processor of Hitachi Ltd. Also, SIMD or vector architectures perform asymmetric shifting by using the two shift operations involved in the execution of PSHIFT.

Figure 9:
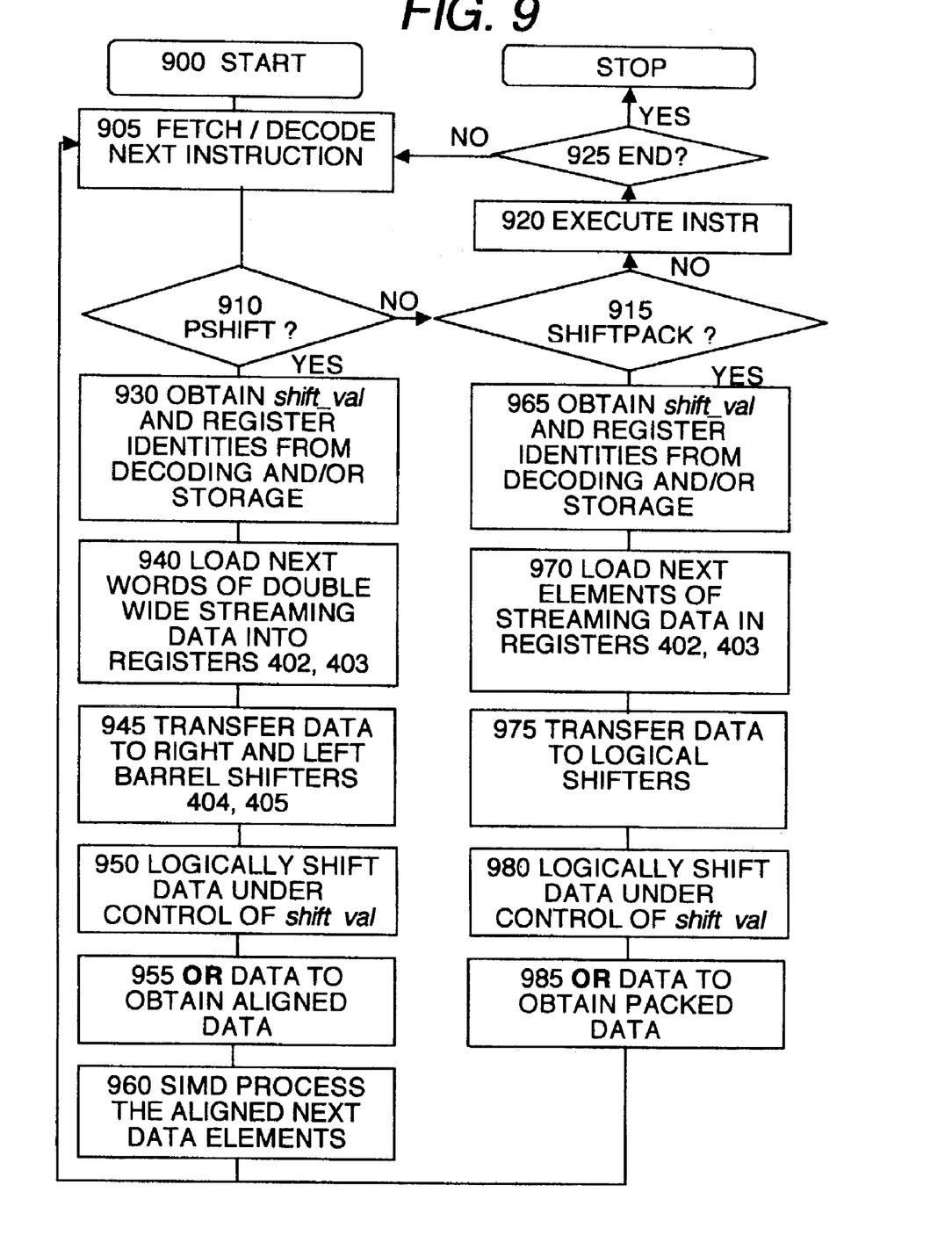
FIG. 9 is a flowchart of a system and program using the PSHIFT operation and the SHIFTPACK operation.

FIG. 9 is a flowchart of the processing performed with respect to the execution of a program that includes one or more of the instructions PSHIFT and SHITFTPACK, as performed on the exemplary SIMD computer system of FIG. 2. The program is implemented in computer readable data stored in tangible form on the memory 208.

STEP 900 includes various steps that may be conventional or not, in preparation for execution of a program or execution of a program segment, for example, including various start up procedures.

STEP 905 fetches from memory 208 the next instruction to be executed by the execution unit 203 according to the flow of the program and by using various known procedures. The fetched next instruction is then decoded in the instruction decode unit 202. The execution unit is shown in more detail in FIG. 3.

STEP 910 determines if the thus fetched and decoded instruction is a PSHIFT instruction. If it is not a PSHIFT instruction, processing continues with step 915 and when it is a PSHIFT instruction, processing continues with step 930.

STEP 915 determines if the thus fetched and decoded instruction is a SHIFTPACK instruction. If it is not a SHIFTPACK instruction, processing continues with step 920 and when it is a SHIFTPACK instruction, processing continues with step 965.

STEP 920 executes the current instruction, which is neither a PSHIFT nor a SHIFTPACK instruction, and processing continues with step 925.

STEP 925 determines if the program has ended, and if it has, the operation of FIG. 9 stops, even though the computer may continue to operate or stand-by in a known manner. When it is determined that the program has not ended, processing continues with step 905, as explained above.

STEP 930 is reached when step 910 determines that the current instruction is a PSHIFT instruction. As mentioned, the PSHIFT instruction includes the parameter shift_val, the value of which was obtained during decoding in step 905 and is the input 401 of FIG. 4. Further the instruction PSHIFT, as decoded, directly or indirectly or inherently identifies the first and second registers 402 and 403. Preferably, such register identification is with the parameters reg_1 and reg_2 of the PSHIFT instruction.

The actual bit encoding of the instruction PSHIFT depends upon the hardware architecture. PSHIFT is either dynamic or logical, meaning that the parameter shift_val is either specified in a register or as an immediate constant value. The identity of registers 402, 403, 404, 405 and 120 may be fixed or named once and their identities maintained for executing of subsequent PSHIFT instructions, but preferably, the registers 402, 403 are identified by the parameters of the instruction PSHIFT.

STEP 940 loads the next double wide streaming data from the memory 208, the audio interface 207, the video interface 210 or the user interface209 of FIG. 2, any of which may provide data from a LAN or WAN (including the internet), for example, into the registers indicated by the decoding of the PSHIFT instruction. For example, the next two words of the streaming data (n bits for each word) are loaded into registers 402 and 403. Then the procedure passes to step 945.

STEP 945 transfers the n bit contents of each of the registers 402 and 403 respectively to the barrel shifters 404 and 405, as indicated in FIG. 4. Thereafter, the procedure passes to step 950.

STEP 950 performs data shifts. In the example the data in the L barrel shifter 404 is logically shifted left a number of bits equal to the register size n minus the shift value (the value of shift_val), which in the exemplary case of the registers being of a size n=64 and the shift value being 33, 31 zeroes (64-33) are moved into the right of the barrel shifter 404 and the previous data 0:32 is now aligned to the left and nulls are now in positions 30:0, as seen in FIG. 1. In the example, the data in the R barrel shifter 405 is logically shifted right a number of bits equal to the shift value, which in the exemplary case with the shift value being 33, 33 zeroes or nulls are moved into the left of the barrel shifter 405 and the previous data 63:33 is now aligned to the right with nulls in positions 63:31, as seen in FIG. 1. Being logical shifting, nulls or zeros are loaded, and in the exemplary implementation, nulls are loaded into the L barrel shifter 404 from the right on the data transferred from the register 402 and nulls or zeros are loaded into the R barrel shifter 405 from the left on the data transferred from the register 403, as shown in FIGS. 1 and 4.

As used herein, shifting is broadly described as in FIGS. 1 and 9, wherein the beginning data is compared to the output data and it is seen that subdivisions in the two inputs of data have been moved a number of bit positions equal to the number of nulls loaded. Loaded, as used herein, refers to the entry of data, here nulls, into a memory (for example, a temporary memory 102, a register 402, 403, a more permanent memory 408, a shift register 404, 405, or merely briefly appearing at an output node while being transmitted to a remote location), and the term loaded as used herein does not place limitations on where the nulls came from or how they are placed adjacent the subdivision of data. The barrel shifters of the FIG. 4 embodiment perform a linear shift where a bit is inserted at one end and a bit is lost at the other end for each cycle, and the shift is logical in that the bit inserted for each cycle is a null or zero.

As mentioned above, the shifting may be arithmetic, which is not the best mode although contemplated according to the broader aspects of the invention. In the present invention, the new combination of the PSHIFT pipe shifter instruction with arithmetic shifting and a sign extension instruction, for example SEXTN (an existing sign extension instruction to sign or zero extend from a given bit position), is also useable to extract data, for example with cyclic or looped shift registers. The SEXTN instruction may exist by itself in some processors and implementations in the prior art. The syntax is: SEXTN var,bit_pos.

Logical shifting is usually available in a processor and would involve less processing than arithmetic shifting.

The logical shifting is performed in the barrel shifters 404 and 405 on the data that was transferred from the registers 402 and 403, respectively, and thereafter, the logically shifted data is transferred to the registers 402 and 403, respectively.

All of the shifting performed by step 950 is under the control of the value of shift_val. In the example, the value of shift_val is 33 and this value is sent to the L barrel shifter 404 in binary form with a bit length of $\log_2 n$ and is sent to the R barrel shifter 405 in binary form as the two's complement of 33 with a bit length of $\log_2 n$. The two's complement is obtained with the 2's complement circuit or software 406 of FIG. 4, which is commonly found in processors, particularly SIMD processors.

For example: after step, 940 register 402 has n bit values 1110110010001000111100010101110100101101110101 011101010100101; after step 950 with a shift value of 33, shifter 404 has bit values 0100101101110101011101 0100101000000000000000000000000000000000; after step 940, register 403 has n bit values 1110011110001111100 001111111000001111111000000111111110000000111; and after step 950 right shifting with a shift value of 33, shifter 405 has bit values 0000000000000000000000000000000 001110011110001111100001111110000.

STEP 955 performs a logical OR with the logical unit 301 of FIG. 3 of the execution unit 203, particularly the OR gate 407 of FIG. 4. The result of the logical OR is stored in temporary register 120 of FIG. 1, and then the result is transferred to another register, for example, register 403 in FIG. 1, although other registers are contemplated, for example a third register, not illustrated. After step 955, the register chosen to hold the aligned data, for example register 403 of FIG. 1, has the representative, now aligned, data with the data elements in alignment suitable for SIMD processing, as follows 0100101101110101010111010101001011 11001111000111110000111110000.

STEP 960 processes the aligned data elements, which for vector processing may be the next two one byte wide elements. With the present invention, shift_val may have any value desired and the data elements processed may have any value and be variable length within the subdivisions of data. Also it is contemplated that the now aligned data elements may be stored for later processing or transmitted to another location for storage or processing.

The aligned individual data elements in output register 403 may be extracted by masking and shifting repeatedly according to known procedures. After SIMD processing the procedure moves through steps 905 and 910 to step 930 when the next instruction is a PSHIFT instruction.

Since the value for shift_val may be any number within the range of the register size n, the invention is not limited to fixed size data elements. The PSHIFT instruction may be used for bit alignment and extraction. Thus the PSHIFT instruction may be used for the alignment and extraction of data elements of any length, including bit extraction.

The present invention approach allows for a number of data extractions for data of arbitrary sizes from consecutive memory loads with just two instructions per data type. The pipe shifter instruction PSHIFT is useable to extract data of arbitrary size from a combination of two registers, which typically may represent consecutive memory locations. Since data types are extracted 'in-register', data is loaded continuously from memory using the maximum allowable machine word size without regard for the data type or the alignment contained in the data, thus maximizing memory throughput.

A data pack function is provided by the data manipulation instruction SHIFTPACK. SHIFTPACK is complementary to the data unpack or alignment function provided by the data manipulation instruction PSHIFT.

SHIFTPACK is used for fixed point and packed data types, e.g.: parsing algorithms like Huffman or variable length coding (VLC) or bit packing, as well as for non-standard fixed-point data handling in DSP operations; most fixed point arithmetic DSP algorithms; and packing data structures or bit fields.

Figure 5:
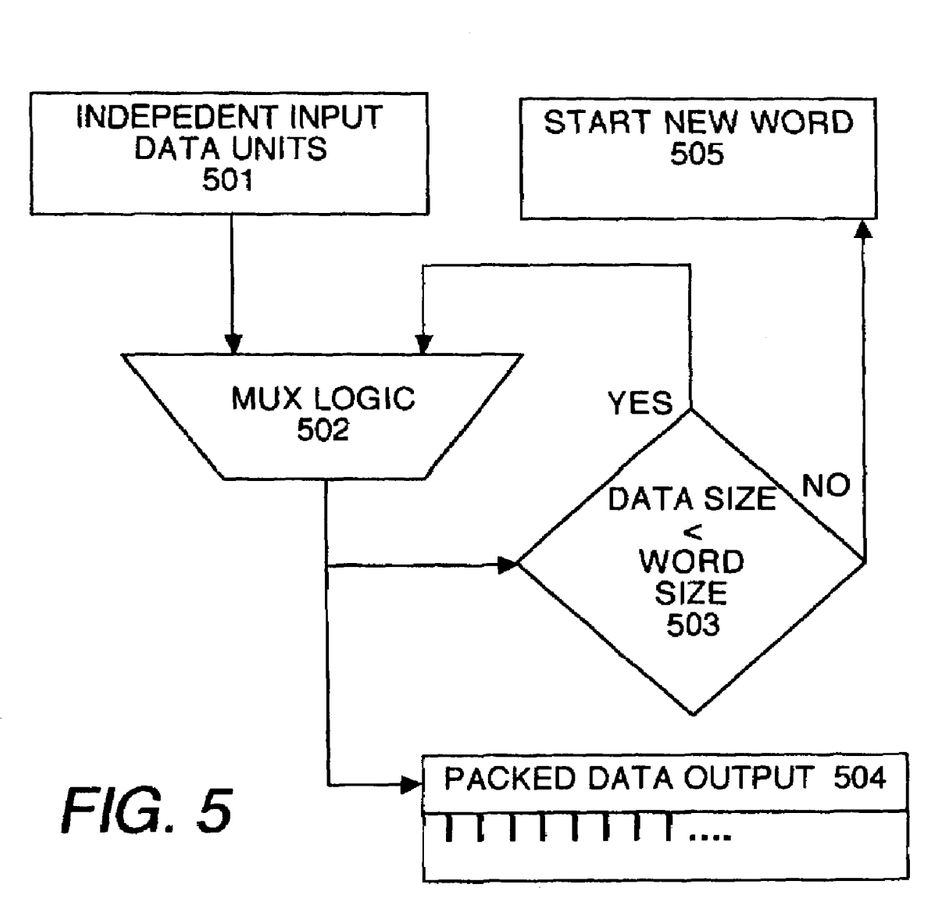
FIG. 5 shows a representative scenario for data packing employable with the SHIFTPACK instruction of the present invention.

The SHIFTPACK instruction packs data of arbitrary size into a packed data word. The instruction may be used in the execution of scenarios such as depicted by FIG. 5. FIG. 5 shows the general mechanism used to pack independent data units 501 of different sizes with MUX (multiplexer) logic 502 into an output of continuous packed data. Typically, the input 501 may be encoded data or variable length codes (VLCs). The packing outputs one maximum word data size (machine word size) at a time. For example, a decision process 503 checks the data size against the word size and starts another word with process 505 when the next data element inclusion would exceed the capacity of the current word. The output buffer 504 therefore holds a continuous packed data stream.

Figure 6:
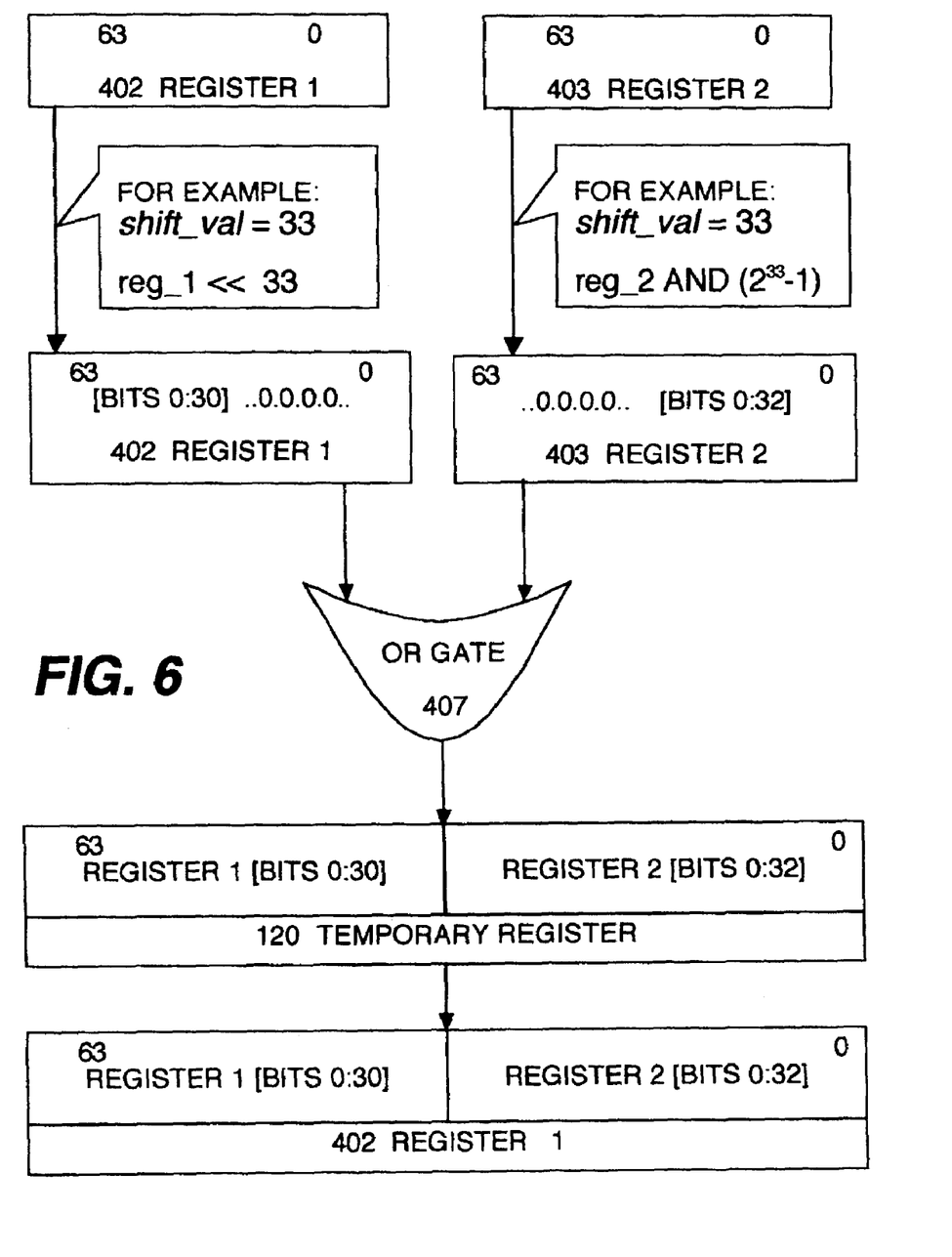
FIG. 6 illustrates the SHIFTPACK instruction or operation of the present invention, for an exemplary shift_val=33.

Exemplary code for the use of the instruction PSHIFT-PACK, as shown in FIG. 6, uses: SHIFTPACK reg_1,reg_2, shift_val, which is executed as follows with respect to an example of usage: LINE 1: SHIFTPACK reg_1,reg_2, shift_val; LINE 2: Tmp_reg=reg_1 left shift by shift_val; LINE 3: reg_1=Tmp_reg OR (shift_mask AND reg_2), where shift_mask=shift_val number of set bits.

The values or parameters used in the example execution of SHIFTPACK as shown in FIG. 6 are reg_1=register 402, reg_2=register 403, and shift_val=33. The logic block diagram of FIG. 6 shows an exemplary implementation for input registers 402 and 403 of bit size n. The number of bits required to specify the unsigned Shift_val is, $\text{Log}_2$ n.

A mask is a pattern of bits used to accept or reject bit patterns in another set of data. For example, if shift_val=4; shift_mask=000 . . . 0001111=$2^{shift\_val}-1$. In the example of FIG. 6, the mask provided has thirty-one zeroes followed by thirty-three ones, under the control of the shift_val=33. LINE 2 is performed in the shifter unit 304 of FIG. 3 and LINE 3 is performed with the logical unit 301 and the control unit 305 of FIG. 3.

Figure 7:
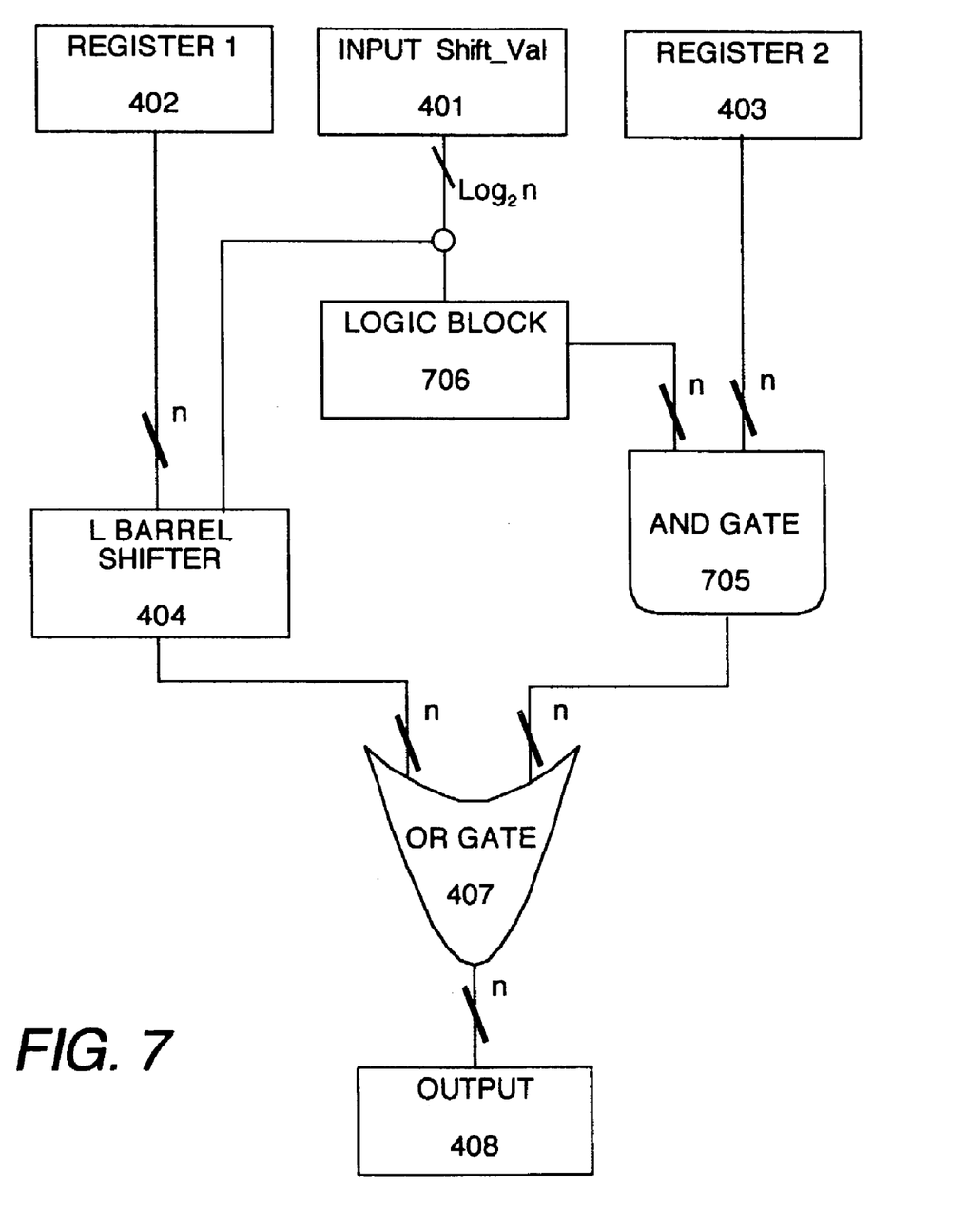
FIG. 7 is an architecture block diagram for the execution of the SHIFTPACK instruction of the present invention.

FIG. 7 is an architecture block diagram for the execution of the SHIFTPACK instruction. The registers 402 and 403 receive adjacent streaming data. The L barrel shifter 404 shifts the data from register 402 in the same manner as the L barrel shifter 404 of FIG. 4, and the L barrel shifter 404 is under control of the shift_val from input 401. The logic block outputs a series of ones adjacent a series of zeroes for a total of n bits, with the division between the zeros and ones being under the control of the shift_val of input 401, as explained above.

The Boolean AND operation provided by the AND gate 705 is used to match the mask of zeros and ones from the logic block 706 with a string of data bits from register 403. When one occurs in the mask, the corresponding bit of data is passed from the register 403 to the OR gate 407 unchanged and when zeros are in the mask, the corresponding bits of data from the register are passed only as zeroes to the OR gate 407. The OR gate 407 performs the logical OR operation to combine the outputs of the two logical operations performed in the L barrel shifters, 404 and the AND gate 705. The result of the logical OR operation is held in the OUTPUT 408, which may be the output node of the OR gate, as in FIG. 1, or the OUTPUT 408 may be held in the temporary register 120 of FIG. 6, or the OUTPUT 408 may be held in the register 403 or the register 402 as in FIG. 6, or the output 408 may merely be a node with the data transmitted to a remote location. The actual implementation used in a commercial embodiment depends upon the available hardware.

The SHIFTPACK instruction replaces existing aligned SIMD or Vector byte level data packing instructions like in the above-mentioned SuperH processor and in SIMD or general-purpose processors. For example in the SH-5 computer, SHORI (shift and OR) MEXTRx extracts a combination of bytes from two registers with constant data.

Figure 8:
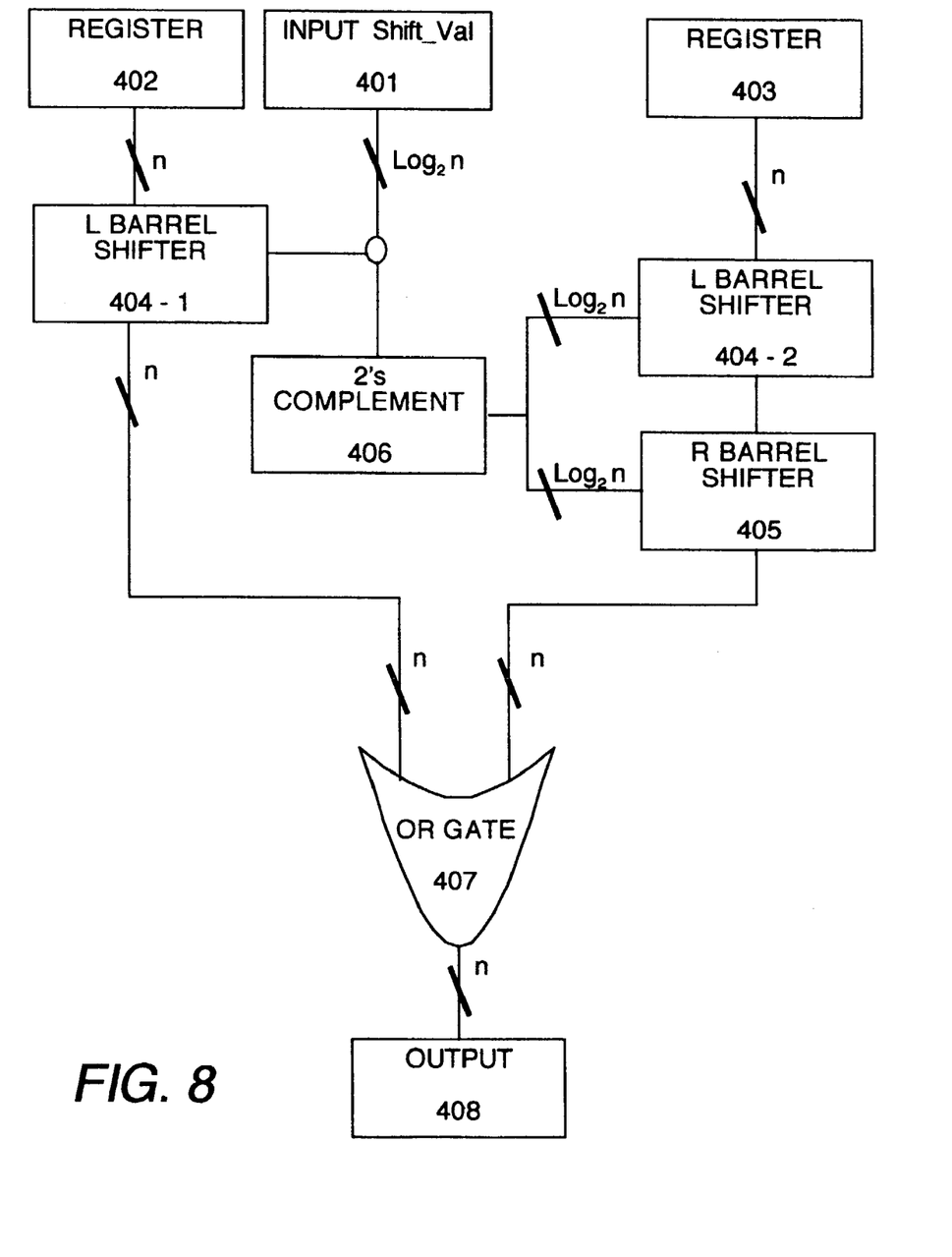
FIG. 8 is another embodiment architecture block diagram for execution of the SHIFTPACK instruction.

The SHIFTPACK instruction is usable to generate addresses in address or pointer based arithmetic, in logical operations and in construction of variable length codes. The three cases of execution disclosed in pseudo-code with respect to FIGS. 6, 7 and 8, are exemplary implementations for SHIFTPACK.

The SHIFTPACK instruction or operation is implemented in FIG. 6, for example, with a computer system having a standard processor using the standard circuits for the shifter and the logical OR operation, a 64-bit register size and a resident instruction such as a zero extend from bit location instruction, which is the same as the sign extend from bit location instruction mentioned in the description of PSHIFT. The use of such an instruction ensures that no AND masking is required for the second register operand before the OR operation. However this may also be done with the execution of two operations.

In FIG. 6, an example parameter value for shift_val is 33. The contents of the first register 402 specified by the SHIFTPACK instruction are logically shifted left under the control of shift_val, so that bits 0:30 originally in register 402 are now aligned to the left in the register 402 and bits 0:32 of register 402 are now nulls or zero. The contents of the second register 403 specified by the SHIFTPACK instruction are logically shifted right under the control of shift_val so that bits 0:32 originally in register 403 are now aligned to the right in the register 403 and bits 33:63 of register 403 are now nulls or zero. The OR gate 607 then logically combines the contents of shift registers 404 and 405 to pack the 0:30 bits originally from register 402 and the 0:32 bits originally from register 403 as bits 0:63 of a temporary register 120, whose contents are then output to register 402.

FIG. 7, as suggested by the pseudo code, is a stand-alone implementation, meaning that it does not require the support of other instructions to pack data. The logic block diagram of FIG. 7 shows input registers 402, 403 of bit size n. The number of bits required to specify the unsigned Shift_val of the input 401 is $\text{Log}_2$ n. The contents of register 402 are transferred to L barrel shifter 404, where they are shifter logically left under the control of the shift value from input 401. The mask $2^{shift\_val}31$ 1 may be generated by a number of techniques depending on the circuits available. In the exemplary implementation, the contents of register 403 are transferred to the AND gate 705, where a logical AND is performed with the output of logic block 706. The logic block 706, shown in FIG. 7, represents exemplary hardware logic used to generate the mask value. The output of the logic block 706 is used in an AND operation of the AND gate 705 to mask the data in register 403.

The n bit wide output of the L barrel shifter 404 and the n bit wide output of the AND gate 705 are logically combined, particularly they are subjected to a logical OR by the OR gate 407. The n bit wide result of the logical combination (provided by the logical shifting, the logic block, the AND gate 705 and the OR gate 407) is transferred as an output 408, and for example, stored in a register, such as the temporary register 120 or the register 402 as in FIG. 6, or register 403 or elsewhere all as controlled by the decoding of the instruction SHIFTPACK.

Another exemplary implementation of SHIFTPACK is shown in FIG. 8. FIG. 8, as suggested by the pseudo code, is a stand-alone implementation, meaning that it does not require the support of other instructions to pack data. The logic block diagram of FIG. 8 shows input registers 402 and 403 of bit size n. The number of bits required to specify the unsigned Shift_val of the input 401 is $\text{Log}_2$ n.

In FIG. 8, the contents of register 402 are transferred to the L barrel shifter 404-1, where they are shifter logically left under the control of the shift value of Shift_val from input 401. The contents of register 403 are transferred to L barrel shifter 404-2, where they are shifter logically left under the control of the shift value from input 401; the control is through the conversion of the input 401 by the 2's complement circuit 406. The output of the L barrel shifter 404-2 is transferred to the R barrel shifter 405, where the bits are shifter logically right under the control of the shift value from input 401; the control is through the conversion of the input 401 by the 2's complement circuit 406.

The n bit wide output of the L barrel shifter 404-1 and the n bit wide output of the R barrel shifter 405 are logically combined, particularly they are subjected to a logical OR by the OR gate 407. The n bit wide result of the logical OR combination is transferred as an output 408, and for example, stored in a register, such as the temporary register 120 or the register 402 as in FIG. 6, or register 403 or elsewhere all as controlled by the decoding of the instruction SHIFTPACK.

Therefore, it is seen that FIG. 8, performs a left logical shifting followed by a logical right shifting resulting in a desired masking effect of the data in register 403. Such shifting techniques are commonly used in zero extension operations. The two shift coefficients required are supplied as Shift_val and n-Shift_val. The latter term n-Shift_val is easily computed using the two's complement circuit 406, which is usually a standard circuit in processors such as a SIMD processor or vector processors.

The register 402, the register 403 and the input 401 of the Shift_val are preferably specified in the decoding of the instruction SHIFTPACK according to the best mode of implementing the invention. The barrel shifters 404, 404-1, 404-2, 405 may be discrete circuits or dual barrel shifters as found in SIMD or vector processors. The 2/s complement circuit 406 has been explained above with respect to FIG. 4.

The implementations of FIGS. 7 and 8 are usable in the scenario of FIG. 5 and implement the exemplary data case of FIG. 6, according to the method of FIG. 9. The actual implementation may vary from FIGS. 7 and 8, depending upon the available hardware.

In FIG. 9, when a SHIFTPACK instruction is encountered in step 915, step 965 follows.

STEP 965 is reached when step 910 determines that the current instruction is not a PSHIFT instruction and step 915 determines that the current instruction is a SHIFTPACK instruction. As mentioned, the SHIFTPACK instruction includes the parameter shift_val, the value of which was obtained during decoding in step 905 and is the input 401 of FIGS. 7 and 8. Further the instruction SHIFTPACK, as decoded in step 905, directly or indirectly or inherently identifies the first and second registers 402 and 403. Preferably, such identification is with one or both of the parameters reg_1 and reg_2 of the SHIFTPACK instruction.

The actual bit encoding of the instruction SHIFTPACK depends upon the hardware architecture. SHIFTPACK is either dynamic or logical, meaning that the parameter shift_val is either specified in a register or as an immediate constant value. The identity of registers 402, 403, 404, 404-1, 404-2, 405 and 120 may be fixed or named once and their identities maintained for executing of subsequent SHIFTPACK instructions.

STEP 970 loads the next double wide streaming data from the memory 208, the audio interface 207, the video interface 210 or the user interface 209 of FIG. 2, any of which may provide data from a LAN or WAN (including the internet), for example, into the registers indicated by the decoding of the SHIFTPACK instruction. For example, the next two words of the streaming data (n bits for each word) are loaded into registers 402 and 403. Then the procedure passes to step 975.

STEP 975 transfers the n bit contents of the registers 402 to the L barrel shifter 404 for FIG. 7 and 404-1 for FIG. 8. STEP 975 also transfers the n bit contents of the register 403 to the AND gate 705 for FIG. 7 or the L barrel shifter 404-2 and R barrel shifter 405 logical shifting combination as indicated in FIG. 8. Thereafter, the procedure passes to step 980.

STEP 980 performs logical data shifts. In the example implementations of FIGS. 7 and 8, the data in the L barrel shifter 404 and 404-1 is logically shifted left a number of bits equal to the shift value (the value of shift_val), which in the exemplary case of FIG. 6 with the registers being of a size n=64 and the shift value being 33, 33 zeroes are moved into the right of the barrel shifters 404 and 404-1 and the previous data 0:30 is now aligned to the left and followed by nulls in positions 63:31, as seen in FIG. 6. In the example implementation of FIG. 7, the data from the register 403 is logically shifted right a number of bits equal to the 2's complement of the shift value, which in the exemplary case of FIG. 6 with the shift value being 33, 31 zeroes or nulls are then to the left in the output of the AND gate 705 and the previous data 0:32 is now aligned to the right with nulls in positions 63:33, as seen in FIG. 6. In the example implementation of FIG. 8, the data from the register 403 is first logically shifted left a number of bits equal to the 2's complement of the shift value and then logically shifted right a number of bits equal to the 2's complement of the shift value, which in the exemplary case of FIG. 6 with the shift value being 33, 31 zeroes or nulls are then to the left in the output of the shifter 405 and the previous data 0:32 is now aligned to the right with nulls in positions 63:33, as seen in FIG. 6. Being logical shifting, nulls or zeros are forced or loaded in the data output to the OR gate 407.

As mentioned above, the logical shifting may initially be arithmetic and then followed by a separate loading of nulls, which is not the best mode although it is contemplated according to the broader aspects of the invention. The logical shifting is performed in the barrel shifters or the combination of the logic block and the AND gate for masking in the embodiments.

All of the logical shifting performed by step 980 is under the control of the value of shift_val. In the example, the value of shift_val is 33 and this value is used directly and as the two's complement of 33, each in binary form with a bit length of $Log_2$ n. The two's complement is obtained with the 2's complement circuit or software 406 of FIG. 8, which is commonly found in processors, particularly SIMD processors.

For example: after step, 975 register 402 has n bit values of 1110110010001000111100010101110100101101110101 01011101010100101; after step 980 with a shift value of 33, the left input to the OR gate 407 has bit values 00101 1011101010101110101010010100000000000000000000 000000000000; after step 975, the register 403 has n bit values of 1110011110001111100001111110000011111110 00000111111110000000111; and after step 980 with a shift value of 33, the right input of OR gate 407 has bit values of 00000000000000000000000000000000001111111000000 111111110000000111.

STEP 985 performs a logical OR with the logical unit 301 of FIG. 3 of the execution unit 203, particularly the OR gate 407 of FIG. 7 or 8. The result of the logical OR is stored in temporary register 120 of FIG. 6, and then the result is transferred to another register, for example, register 402 in FIG. 6 or register 403, although other registers are contemplated, for example a third register, not illustrated. After step 985, the register chosen to hold the packed data, for example register 403 of FIG. 6, has the representative packed data as follows: 001011011101010101110101010010100111111110 00000111111110000000111.

The SHIFTPACK operation is generic and can replace standard SIMD or vector instructions for byte level data packing or extraction, for example the SuperH SH-5 processor has instructions like MEXTRx-Extract to extract a continuous combination of bytes from two registers, or SHORI-shift with constant data. SIMD or vector architectures may also facilitate functionality for asymmetric shifting as is suggested by the multiple shift operations involved in the execution of SHIFTPACK.

The actual bit encoding of the SHIFTPACK instruction depends upon the hardware architecture. SHIFTPACK may be either dynamic or logical, meaning that the parameter shift_val could be specified in either a register or as an immediate constant value.

Generically, the instructions SHIFTPACK and PSHIFT are each referred to herein as a data shift instruction, together having the common features and characteristics mentioned above.

According to the preferred embodiment a barrel shifter is an exemplary shifter, and most barrel shifters have an arithmetic mode and a logical mode. While the arithmetic mode may be used according to the broader aspects of the invention, the preferred mode is the logical mode, which loads nulls or zeros that are useful in the OR operation without additional process steps.

CONCLUSION

The preferred embodiment satisfies the above-mentioned needs by solving the mentioned problems for data manipulation.

While the present invention has been described in connection with a number of embodiments and implementations, the present invention is not so limited but covers various obvious modifications and equivalent arrangements, which fall within the purview of the appended claims.

What is claimed is:

1. A method of manipulating two n bit strings of data, said method being performed by a computer system executing a stand alone implementation of a single instruction that does not require the support of other instructions, comprising the steps of:
   decoding the single instruction;
   identifying two registers of n bits each;
   identifying a shift value specified by a parameter of the single instruction;
   loading a first subset of data of less than n bits to one of the two registers specified by the single instruction;
   loading a second subset of data of less than n bits to the other of the two registers specified by the single instruction;
   selecting the first subset of data from the one of the two registers based solely upon the shift value;
   selecting the second subset of data from the other of the two registers based solely upon the shift value; and
   thereafter concatenating the first subset of data and the second subset of data to obtain an output of manipulated n bits of data; wherein:
     selecting the first subset comprises logically shifting the bits of data held in the one of the two registers;
     selecting the second subset comprises logically shifting the bits of data held in the other of the two registers; and,
   the step of logically shifting simultaneously transfers the content of the two registers into a left barrel shifter and a right barrel shifter, respectively.

2. The method of claim 1, wherein
   selecting the first subset comprises logically shifting the bits of data held in the one of the two registers by moving the corresponding subset of data toward one end of then bits a number of bit positions and adding an equal number of nulls at the other end of the n bits to obtain a first n bits of shifted data; and
   selecting the second subset comprises logically shifting the bits of data held in the other of the two registers by moving the corresponding subset of data toward an end of the n bits a number of bit positions and adding an equal number of nulls at the opposite end of the n bits to obtain a second n bits of shifted data.

3. The method of claim 1, wherein said step of concatenating performs a logical OR on the outputs of said steps of selecting.

4. A machine readable medium having stored thereon data representing a single instruction executable by said processor to perform the method of claim 1.

5. The method of claim 1, wherein said steps of identifying are parts of said step of decoding with the shift value and register identities being parameters of the single instruction.

6. The method of claim 1, wherein-said step of logically shifting includes supplying a shift coefficient to each of the left barrel shifter and the right barrel shifter as the shift value and n-the shift value, respectively.

7. The method of claim 6, wherein said supplying includes computing the n-shift value from the shift value by using a two's complement of the shift value.

8. The method of claim 1, wherein said combining provides aligned combined data; and further including performing a single operation on multiple sets of the aligned data through parallel processing with a SIMD processor.

9. The method of claim 1,
   wherein said computer system comprises a processing unit including a bus and a memory coupled to the processing unit via the bus,
   wherein the two registers are in the processing unit and coupled to the bus, and
   wherein the first and second subset of data are loaded to the two registers respectively from the memory by said steps of loading.

10. A computer system having SIMD processing architecture, comprising:
   a processor;
   two registers; and
   a machine readable medium having stored thereon data representing single instruction causing said processor to manipulate two n bit strings of data by performing the steps:
   decoding the single instruction;
   identifying two registers of n bits each;
   identifying a shift value specified by a parameter of the single instruction;
   loading a first subset of data of less than n bits to one of the two registers specified by the single instruction;
   loading a second subset of data of less than n bits to the other of the two registers specified by the single instruction;
   selecting the first subset of data from the one of the two registers based solely upon the shift value;

selecting the second subset of data from the other of the two registers based solely upon the shift value; and thereafter concatenating the first subset of data and the second subset of data to obtain an output of manipulated n bits of data; wherein:

selecting the first subset comprises logically shifting the bits of data held in the one of the two registers;

selecting the second subset comprises logically shifting the bits of data held in the other of the two registers; and, the step of logically shifting simultaneously transfers the content of the two registers into a left barrel shifter and a right barrel shifter, respectively.

11. A method of manipulating two n bit strings of data, said method being performed by a computer system executing a stand alone implementation of a single instruction that does not require the support of other instructions, comprising the steps of:

decoding the single instruction;

loading a first subset of data of less than n bits to a first registers of n bits specified by the single instruction;

loading a second subset of data of less than n bits to a second register of n bits specified by the single instruction;

identifying a shift value specified by a parameter of the single instruction;

identifying a first shift value of n bits minus the shift value for shifting data of the first registers to a first direction;

identifying a second shift value of the shift value for shifting data of the second register to a second direction being an opposite direction of the first direction;

shifting logically a first data in the first register based upon the first shift value by moving the first data toward the first direction and filling nulls into the blank bits caused by the shifting to obtain a first n bits of shifted data;

shifting logically a second data in the second registers based upon the second shift value by moving the second data toward the second direction and filling nulls into the blank bits caused by the shifting to obtain a second n bits of shifted data; and thereafter concatenating the first n bits of shifted data and the second n bits of shifted data by a logical OR to obtain an output of manipulated n bits of data; and, wherein said steps of shifting logically the first and second data simultaneously transfers the contents of the two registers into a left barrel shifter and a right barrel shifter, respectively.

12. The method of claim 11, wherein the first direction is left and the second direction is right.

13. The method of claim 11, wherein said computer system comprises a processing unit including a bus and a memory coupled to the processing unit via the bus, wherein the first and second registers are in the processing unit and coupled to the bus, and wherein the first and second subset of data are loaded to the first and second registers respectively from the memory by said steps of loading.

14. A computer system having SIMD processing architecture, comprising:

a processor;

a first register;

a second register; and a machine readable medium having stored thereon data representing a single instruction executable by said processor to manipulate two n bit strings of data by performing the steps:

decoding the single instruction;

loading a first subset of data of less than n bits to a first registers of n bits specified by the single instruction;

loading a second subset of data of less than n bits to a second register of n bits specified by the single instruction;

identifying a shift value specified by a parameter of the single instruction;

identifying a first shift value of n bits minus the shift value for shifting data of the first registers to a first direction;

identifying a second shift value of the shift value for shifting data of the second register to a second direction being an opposite direction of the first direction;

shifting logically a first data in the first register based upon the first shift value by moving the first data toward the first direction and filling nulls into the blank bits caused by the shifting to obtain a first n bits of shifted data;

shifting logically a second data in the second registers based upon the second shift value by moving the second data toward the second direction and filling nulls into the blank bits caused by the shifting to obtain a second n bits of shifted data; and thereafter concatenating the first n bits of shifted data and the second n bits of shifted data by a logical OR to obtain an output of manipulated n bits of data; and, wherein said steps of shifting logically the first and second data simultaneously transfers the contents of the two registers into a left barrel shifter and a right barrel shifter, respectively.

* * * * *

UNITED STATES PATENT AND TRADEMARK OFFICE
CERTIFICATE OF CORRECTION

PATENT NO.        : 7,275,147 B2                                      Page 1 of 1
APPLICATION NO.   : 10/403152
DATED             : September 25, 2007
INVENTOR(S)       : Clifford Tavares It is certified that error appears in the above-identified patent and that said Letters Patent is hereby corrected as shown below:

Col. 5, line 65 delete "S1MD", insert --SIMD--    p.11, line 19

Col. 10, line 36 delete "$2^{shift\_val}31\ 1$", insert --$2^{shift\_val\ 31\ 1}$--    p.20, line 2

Signed and Sealed this

Twenty-seventh Day of November, 2007

JON W. DUDAS
*Director of the United States Patent and Trademark Office*